(12) United States Patent
Mittal

(10) Patent No.: US 8,842,005 B1
(45) Date of Patent: Sep. 23, 2014

(54) ALERTS BASED ON DANGER IN THE VICINITY OF A CLIENT DEVICE

(71) Applicant: Google Inc., Mountain View, CA (US)

(72) Inventor: Sanjeev Kumar Mittal, Bangalore (IN)

(73) Assignee: Google Inc., Mountain View, CA (US)

( * ) Notice: Subject to any disclaimer, the term of this patent is extended or adjusted under 35 U.S.C. 154(b) by 20 days.

(21) Appl. No.: 13/834,518

(22) Filed: Mar. 15, 2013

(51) Int. Cl.
G08B 1/08 (2006.01)
G08C 19/16 (2006.01)

(52) U.S. Cl.
USPC ............ 340/539.22; 340/539.26; 340/870.16; 340/870.26

(58) Field of Classification Search
USPC ............. 340/539.11, 539.13, 539.22, 539.26, 340/870.01, 870.16, 870.26, 531; 381/56, 381/57; 198/502.1, 810.02
See application file for complete search history.

(56) References Cited

U.S. PATENT DOCUMENTS

| 4,827,458 | A | 5/1989 | D'Alayer de Costemore D'Arc |
| 7,181,229 | B2 | 2/2007 | Singh et al. |
| 7,740,130 | B2 * | 6/2010 | Wallace et al. ........... 198/810.02 |
| 7,942,258 | B2 * | 5/2011 | Wallace et al. ........... 198/810.02 |
| 8,212,661 | B2 | 7/2012 | Shuster |
| 8,223,980 | B2 * | 7/2012 | Dooling et al. ................. 381/56 |
| 8,345,885 | B2 * | 1/2013 | Takada ............................ 381/57 |
| 2004/0155770 | A1 * | 8/2004 | Nelson et al. ................. 340/531 |
| 2008/0175399 | A1 * | 7/2008 | Kim et al. ....................... 381/57 |

FOREIGN PATENT DOCUMENTS

JP   11-327588 A   11/1999

* cited by examiner

Primary Examiner — Van T. Trieu
(74) Attorney, Agent, or Firm — Leydig, Voit & Mayer, Ltd.

(57) ABSTRACT

A system and method associated with providing an alert at a client device. The system and method include receiving one or more signals indicative of a surrounding environment of a client device. The system and method further include analyzing the signals to determine a risk factor associated with the surrounding environment of the client device. The risk factor associated with the surrounding environment is then compared to a threshold indicative of a confidence level that a user of the client device may be in danger. Based on the comparison between the risk factor and the threshold, an alert may be issued at the client device to inform the user of the potential danger.

27 Claims, 12 Drawing Sheets

US 8,842,005 B1

ALERTS BASED ON DANGER IN THE VICINITY OF A CLIENT DEVICE

BACKGROUND

Over time, multimedia content available for use on a client device has increased. Furthermore, client device users can take advantage of the multimedia content available on the client device at almost any time and place. A user utilizing headphones to listen to multimedia content may have a decreased awareness to the surrounding environment.

SUMMARY

One embodiment provides a method for providing an alert at a client device. The method includes receiving an ambient noise signal; determining a frequency of the ambient noise signal; analyzing the frequency of the ambient noise signal to determine a change in frequency of the ambient noise signal over time; determining a first risk factor based on the change in frequency of the ambient noise signal over time; and providing an alert at the client device based on the first risk factor.

Another embodiment includes a computer readable storage device for providing an alert at a client device. The computer readable storage device having computer executable instructions for performing the steps of receiving an ambient noise signal; determining a frequency of the ambient noise signal; analyzing the frequency of the ambient noise signal to determine a change in frequency of the ambient noise signal over time; determining a first risk factor based on the change in frequency of the ambient noise signal over time; and providing an alert at the client device based on the first risk factor.

Yet another embodiment includes a mobile alert system configured to provide an alert at a client device. The mobile alert system comprising: a location awareness engine, the location awareness engine configured to receive one or more signals indicative of the surrounding environment of the client device, the signals indicative of a surrounding environment of the client device comprise: an ambient noise signal received from a microphone coupled to the client device; wherein the location awareness engine is configured to determine a total risk factor based on the signals indicative of the surrounding environment of the client device, and cause the client device to provide an alert based on the total risk factor.

DETAILED DESCRIPTION

Over time, multimedia content available for use on a client device has increased. Furthermore, client device users can take advantage of the multimedia content available on the client device at almost any time and place. Many types of multimedia content can distract a user's attention, such as audio content, video content, text content, or any type of media that can be experienced on a client device.

Regarding a user having a decreased awareness to the surrounding environment, one example use case is a user utilizing headphones to listen to multimedia content. In this situation, the user may have a decreased awareness to the surrounding environment because of the proximity of the audio portion of the multimedia in relation to the user's ears. This problem can be further exacerbated by a high volume level of the multimedia content.

While in some use cases a user's awareness to the surrounding environment while listening to audio content is not an issue, in certain circumstances a user should be aware of the surrounding environment. One such instance is when the user is potentially in danger. For example, if the user is walking in proximity to an area known to have high vehicular traffic such as a railway or road and using headphones to listen to music on a client device, then there is potential for the user to be in danger because the music playing in the headphones reduces the user's ability to listen to the surrounding environment. In this particular situation, the preoccupied user may not be able to hear an approaching vehicle, such as a car or train, and if the user is close enough to the road or train track, the user may be injured.

Therefore, an alert provided at the client device informs the user of the impending danger. To provide this alert, certain factors pertaining to the surrounding environment of the user may be analyzed. Examples include the ambient noise, the location, and a public record of accidents at the user/client device's location.

Figure 1:
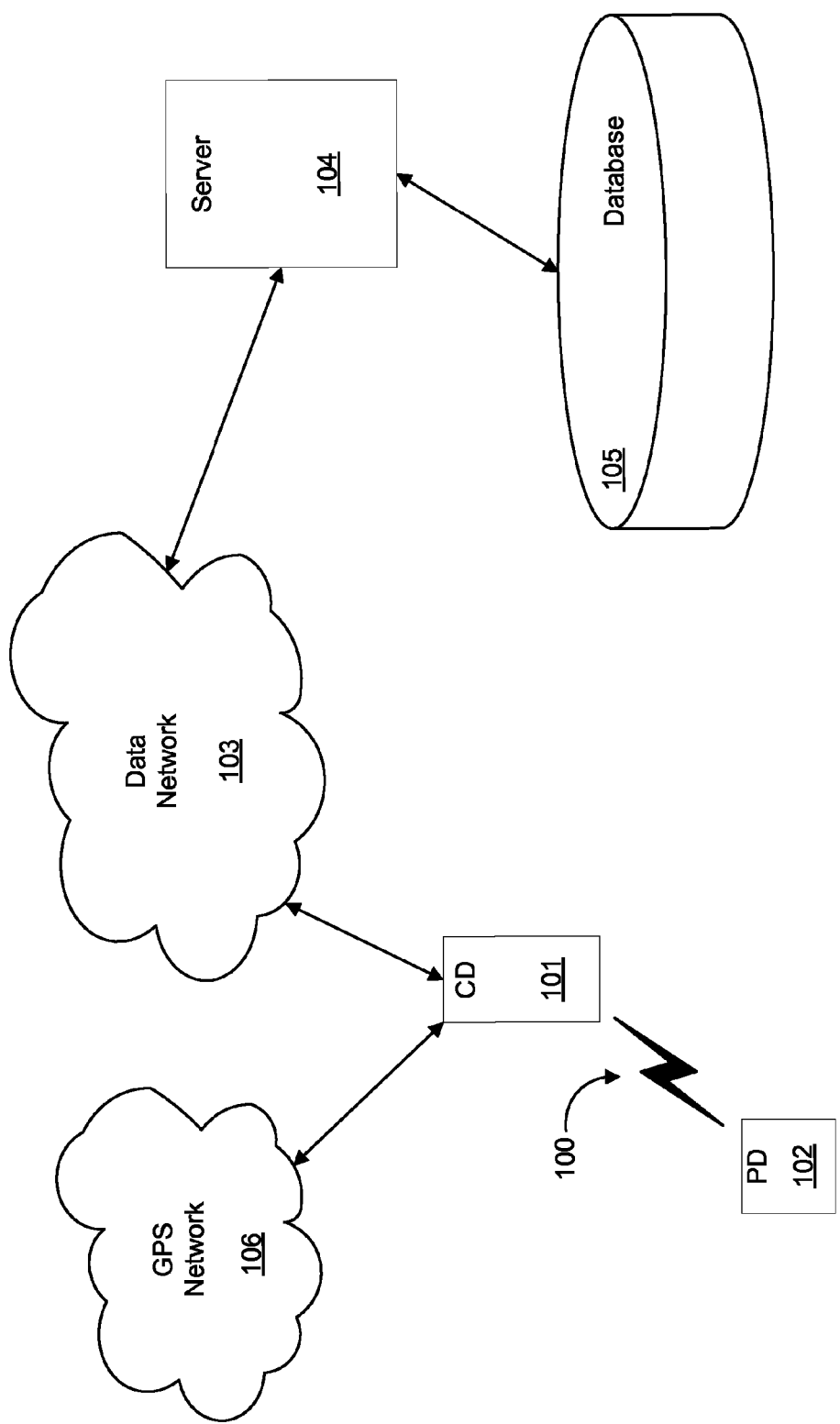
FIG. 1 is a block diagram illustrating a system for providing an alert to a user at a client device, according to an example embodiment.

FIG. 1 is a block diagram of an example communications environment in which various embodiments of the present disclosure may be implemented. In the environment depicted in FIG. 1, a client device 101 is connected to a server 104 through a data network 103. The client device 101 may be a mobile device such as a smart phone, a tablet computer, a laptop computer, a watch with a computer operating system, a personal digital assistant (PDA), a video game console, a wearable or embedded digital device(s), or any one of a number of additional devices capable of playing multimedia content and being transported by a user.

The data network 103 of FIG. 1 is generally a wireless network. Example networks include but are not limited to Wide Area Networks (WAN) such as a Long Term Evolution (LTE) network, a Global System for Mobile Communications (GSM) network, a Code Division Multiple Access (CDMA) network, Wireless Local Area Networks (WLAN) such as the various IEEE 802.11 standards, or any other kind of data network. The data network 103 allows the client device 101 to communicate with the server 104. For example, client device 101 may transmit information to the server 104 and receive information from the server 104. Data network 103 may include a set of cell towers, as well as a set of base stations and/or mobile switching centers (MSCs). In some embodiments, the data network 103 may include various cell tower/base station/MSC arrangements.

Server 104 is connected to the client device 101 through the data network 103. The connection enables server 104 to both receive data from the client device 101 and to transmit data to the client device 101. The server 104 comprises processors and memory configured to receive information from one or more client devices, such as client device 101. In one embodiment, processors and memory located at the server 104 may be configured to access the Internet. In another embodiment, processors and memory located at the server 104 may further be configured to aggregate information pertaining to public accident data for animals, humans, and vehicles at specific locations at a database, such as database 105. The client device 101 is capable of sending a query to the server 104 regarding accident reports in the public record at a specific location through the data network 103. In the embodiment where server 104 accesses the Internet, the server 104 receives a location from the client device 101 and queries the Internet for accident reports at that specific location and provides those reports to the client device 101 through the data network 103. In the embodiment where database 105 includes an aggregation of public accident reports at specific locations, the client device 101 sends location information to the server 104, and server 104 accesses database 105 to collect the accident reports and then relays the accident reports to the client device 101 through the data network 103.

In certain embodiments of the disclosure, the client device 101 receives location information from a data network such as Global Positioning System (GPS) 106. In this embodiment, the client device 101 receives its location from the GPS network 106 in terms of GPS coordinates, which can be used to determine a precise location of the client device 101.

In other embodiments, where the client device 101 is unable to communicate with the GPS network 106, or the GPS functionality on the client device 101 is turned off, the client device 101 attempts to ascertain its location based on its connection to data network 103. For example, if data network 103 is a WLAN system or a WAN system, then the client device 101 can either approximate its location based on a known physical location of the WLAN or WAN access point to which the client device 101 is currently attached, or the client device 101 can triangulate its position based on a measured signal strength received from at least two access points.

Once a location of the client device 101 is ascertained, the client device 101 queries the Internet via the data network 103, or queries a map stored on a local memory device of the client device 101 for an approximation as to the proximity of the client device 101 to a potential hazard such as a road or railway. An alert is then output from the client device 101 to warn the user of the client device 101 of the potential hazard.

Figure 2:
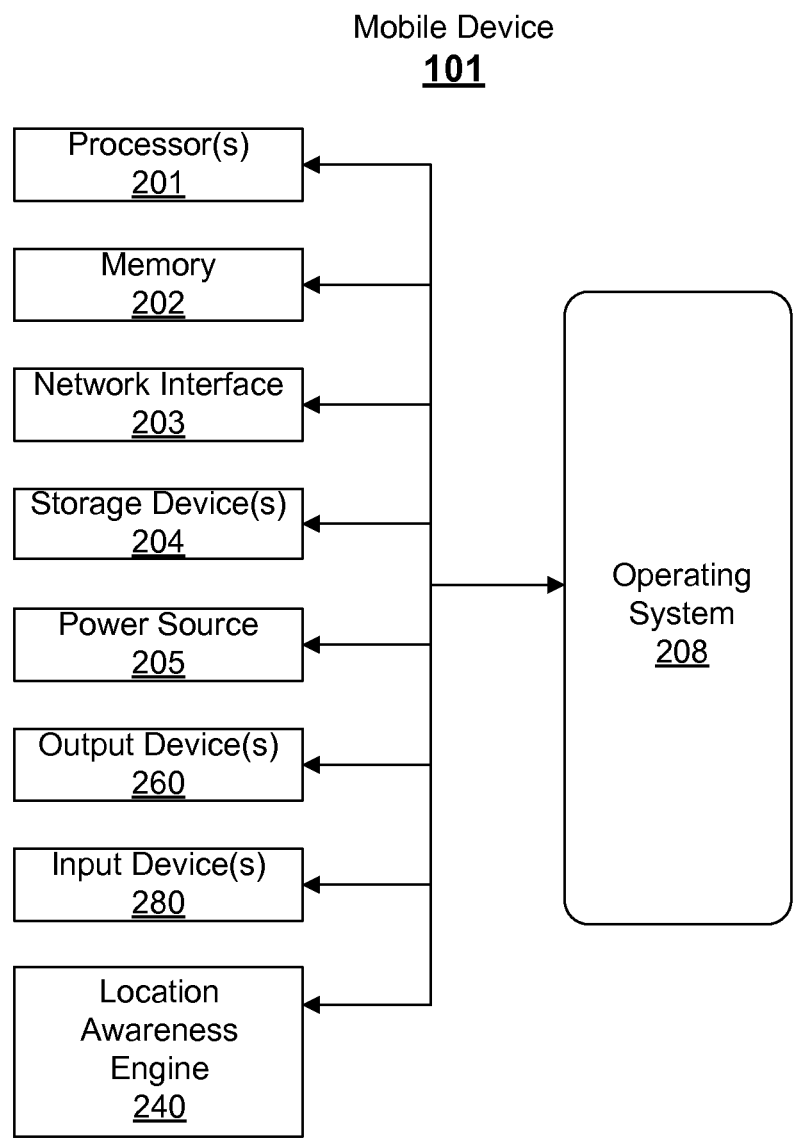
FIG. 2 is a block diagram illustrating components of a client device of FIG. 1 configured to provide an alert, according to one embodiment.

Turning now to FIG. 2, a block diagram of basic functional components for the client device 101 of FIG. 1, according to one aspect of the disclosure, is illustrated. In general, many other embodiments of the client device 101 may be used. In the illustrated embodiment of FIG. 2, the client device 101 includes one or more processors 201, memory 202, a network interface 203, one or more storage devices 204, power source 205, one or more output devices 260, and one or more input devices 280. The client device 101 also includes an operating system 208. Each of the components including the processor 201, memory 202, network interface 203, storage device 204, power source 205, output device 260, input device 280, and the operating system 208 is interconnected physically, communicatively, and/or operatively for inter-component communications.

As illustrated, processor 201 is configured to implement functionality and/or process instructions for execution within client device 101. For example, processor 201 executes instructions stored in memory 202 or instructions stored on a storage device 204. Memory 202, which may be a non-transient, computer-readable storage medium, is configured to store information within client device 101 during operation. In some embodiments, memory 202 includes a temporary memory, an area for information not to be maintained when the client device 101 is turned off. Examples of such temporary memory include volatile memories such as random access memories (RAM), dynamic random access memories (DRAM), and static random access memories (SRAM). Memory 202 also maintains program instructions for execution by the processor 201.

Storage device 204 also includes one or more non-transient computer-readable storage media. The storage device 204 is generally configured to store larger amounts of information than memory 202. The storage device 204 may further be configured for long-term storage of information. In some examples, the storage device 204 includes non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The client device 101 uses network interface 203 to communicate with external devices via one or more networks, such as the data network 103 of FIG. 1, one or more wireless networks, and other types of networks through which a communication with the client device 101 may be established. Network interface 203 may be a network interface card, such as an Ethernet card, an optical transceiver, a radio frequency transceiver, or any other type of device that can send and receive information. Other non-limiting examples of network interfaces include Bluetooth®, 3G and WiFi® radios in client computing devices, and USB.

The client device 101 includes one or more input devices 280. Input devices 280 are configured to receive input from a user or a surrounding environment of the user through tactile, audio, and/or video feedback. Non-limiting examples of input device 280 include a presence-sensitive screen, a mouse, a keyboard, a voice responsive system, video camera, microphone or any other type of input device. In some examples, a presence-sensitive screen includes a touch-sensitive screen.

One or more output devices 260 are also included in client device 101. Output devices 260 are configured to provide output to a user using tactile, audio, and/or video stimuli. Output device 260 may include a display screen (part of the presence-sensitive screen), a sound card, a video graphics adapter card, or any other type of device for converting a signal into an appropriate form understandable to humans or machines. Additional examples of output device 260 include a speaker such as headphones, a cathode ray tube (CRT) monitor, a liquid crystal display (LCD), or any other type of device that can generate intelligible output to a user.

The client device 101 includes one or more power sources 205 to provide power to the device. Non-limiting examples of power source 205 include single-use power sources, rechargeable power sources, and/or power sources developed from nickel-cadmium, lithium-ion, or other suitable material.

The client device 101 includes an operating system 208. The operating system 208 controls operations of the components of the client device 101. For example, the operating system 208 facilitates the interaction of the processor(s) 201, memory 202, network interface 203, storage device(s) 204, input device 280, output device 260, and power source 205.

In certain embodiments of the disclosure, the client device 101 further includes a location awareness engine 240, as illustrated in FIG. 2. The location awareness engine 240 receives one or more signals indicative of the surrounding environment of the client device 101. For instance, the signals may include an ambient noise signal, a location of the client device 101, and/or a public record of accidents that occurred at the location of the client device 101, or any other signals capable of providing information regarding the surrounding environment of the client device 101. Utilizing at least one of the signals, the location awareness engine 240 is capable of determining whether or not to alert the user as to an upcoming danger.

Figure 3:
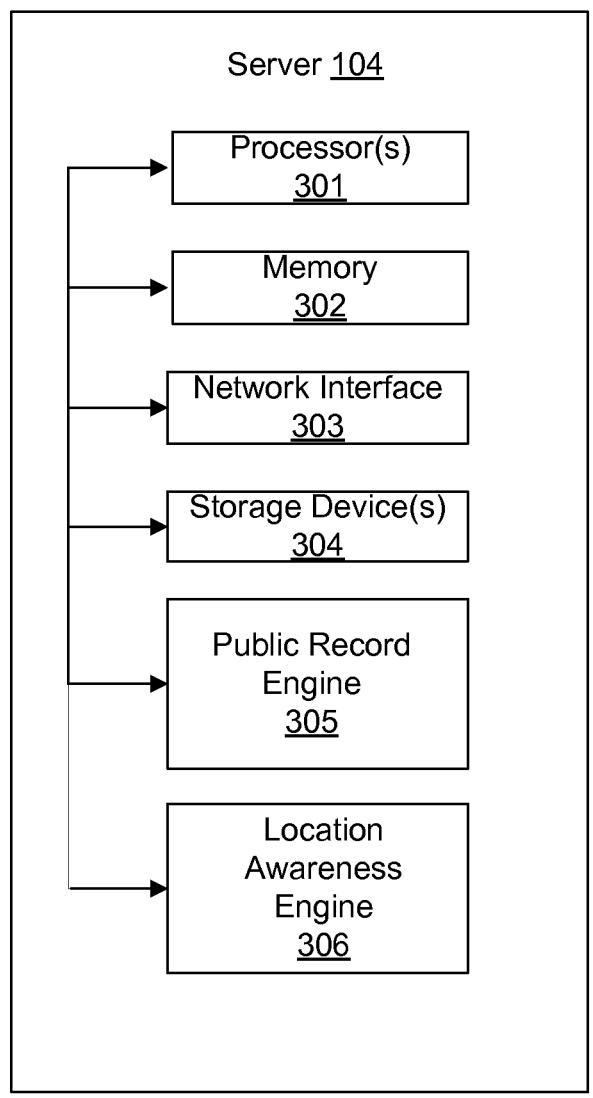
FIG. 3 is a block diagram illustrating functional components for a server of FIG. 1, according to one embodiment.

Moving to FIG. 3, a block diagram of basic functional components for a server 104 is depicted, according to one aspect of the disclosure. Specifically, server 104 is configured to retrieve public record data pertaining to human, animal, and/or vehicular accidents at a particular location through a public record engine 305. In some examples, vehicular accidents may include accidents involving automobiles, busses, trains, etc. Additionally, in certain embodiments of the disclosure, a location awareness engine 306 may reside on the server and be configured to receive signals corresponding to the surrounding environment of the client device 101 and, in certain situations, command the client device 101 to provide an alert.

More generally, beyond the public record engine 305 and the location awareness engine 306, the server 104 includes one or more processors 301, memory 302, network interface 303, and one or more storage devices 304. In some embodiments, each of the components including the processor(s) 301, memory 302, network interface 303, storage device 304, public record engine 305 and location awareness engine 306 are interconnected physically, communicatively, and/or operatively for inter-component communications.

As illustrated, processors 301 are configured to implement functionality and/or process instructions for execution within server 104. For example, processors 301 execute instructions stored in memory 302 or instructions stored on storage devices 304. Memory 302, which may be a non-transient, computer-readable storage medium, is configured to store information within server 104 during operation. In some embodiments, memory 302 includes a temporary memory, i.e. an area for information not to be maintained when the server 104 is turned off. Examples of such temporary memory include volatile memories such as random access memories (RAM), dynamic random access memories (DRAM), and static random access memories (SRAM). Memory 302 also maintains program instructions for execution by the processors 301.

Storage devices 304 also include one or more non-transient computer-readable storage media. Storage devices 304 are generally configured to store larger amounts of information than memory 302. Storage devices 304 may further be configured for long-term storage of information. In some examples, storage devices 304 include non-volatile storage elements. Non-limiting examples of non-volatile storage elements include magnetic hard discs, optical discs, floppy discs, flash memories, or forms of electrically programmable memories (EPROM) or electrically erasable and programmable (EEPROM) memories.

The server 104 uses network interface 303 to communicate with external devices via one or more networks, such as the data network 103 of FIG. 1. Such networks may include one or more wireless networks, wired networks, fiber optics networks, and other types of networks through which communication between the server 104 and an external device may be established. Network interface 303 may be a network interface card, such as an Ethernet card, an optical transceiver, a radio frequency transceiver, or any other type of device that can send and receive information.

The public record engine 305 includes program instructions and/or data that are executable by the server 104. The program instructions and data included in the public record engine 305 includes instructions to receive location information from a client device, such as the client device 101, and to utilize that location to query memory 302, and/or at an external database, such as database 105, and/or the internet for public records pertaining to human and animal accidents at that particular location. The program instructions and data further include instructions for relaying, back to the client device 101, a total quantity of such accidents at the particular location of the client device 101.

Figure 4:
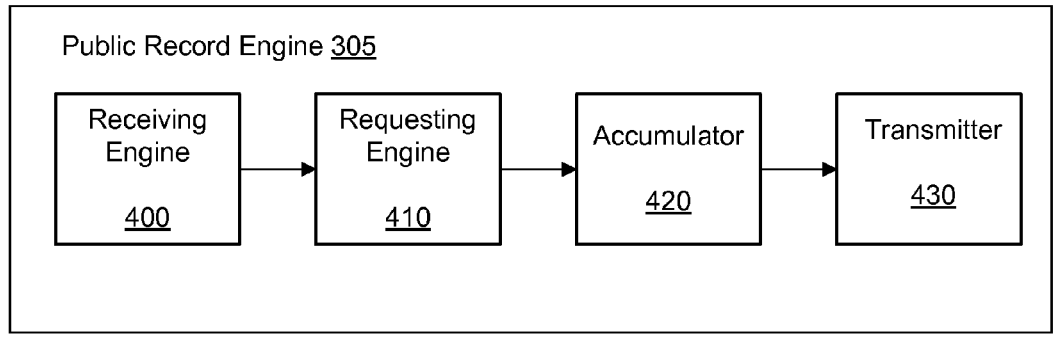
FIG. 4 is a block diagram illustrating the various states of a processor within a server during the process of retrieving public accident records related to a particular location of the client device, according to an example embodiment.

FIG. 4 is a block diagram of the Public Record Engine 305, according to one embodiment of the disclosure. The block diagram represents various states of a processor within a server during the process of retrieving a public record of human, animal, and/or vehicular accident data related to a particular location of the client device 101 from FIG. 1, according to a particular embodiment of the disclosure. At 400, the processor(s) 301 of server 104 are configured as a receiving engine. The receiving engine 400 is configured to receive a location of the client device 101 either in terms of a GPS location or a location determined based on specific connection parameters from one or more WLAN or WAN access points.

At 410, the processor(s) 301 of server 104 are configured as a requesting engine. The requesting engine 410 queries the Internet or a database, such as database 105, for information associated with the request received at 400. The information associated with the request may include an accident report pertaining to a human, animal, and/or vehicular accident that occurred at the geographic location received by the receiving engine 400. The accident report may further contain data or information related to a number of accidents, severity of an accident, damage to property, a timestamp associated with an accident, or a kind of vehicle involved in the accident.

At 420, the processor(s) 301 of server 104 are configured as an accumulator. At 420, the accumulator is configured to aggregate the accident reports received as a result of the query from the requesting engine 410. The aggregation of accident reports is then accumulated into a collection of accident reports.

At 430, the processor(s) 301 of server 104 are configured as a transmitter. At 430, the transmitter is configured to transmit the collection of accident reports. Specifically, the transmitter 430 transmits the collection of accident reports to the location awareness engine 240 (see, FIG. 2) and/or the location awareness engine 306 (see, FIG. 3), depending on the specific embodiment of the disclosure.

Figure 5:
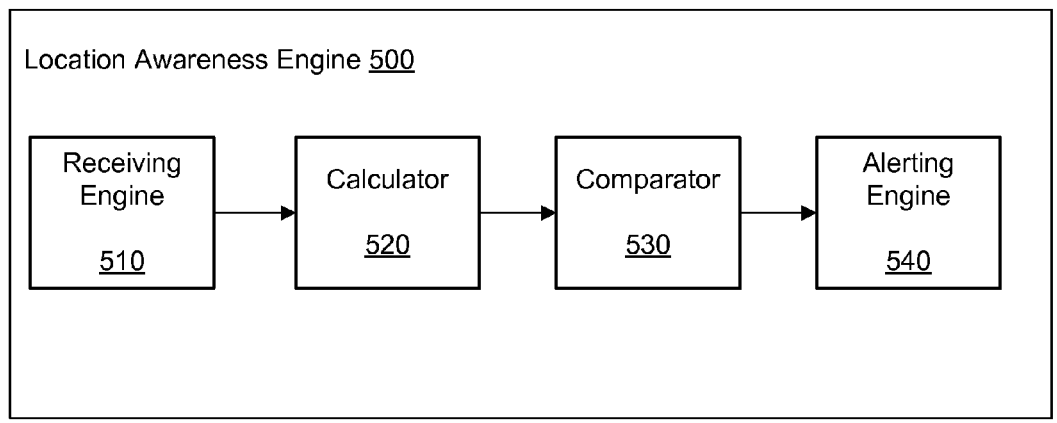
FIG. 5 is a block diagram illustrating the various states of a processor within a client device during the process of providing an alert at the client device, according to an example embodiment.

FIG. 5 is a block diagram of the various states of the location awareness engine 500, according to one embodiment of the disclosure. In certain embodiments, the location awareness engine 500 may take the form of the location awareness engine 240 from FIG. 2 executing on a processor 201 of the client device 101, or the location awareness engine 306 from FIG. 3 executing on a processor 301 within a server 104. In either embodiment, the location awareness engine 500 of FIG. 5 takes on the various states illustrated in FIG. 5 during the process of determining a risk of danger due to the surrounding environment of the client device 101, and providing an alert if the risk warrants an alert. At 500, the processor(s) 201/301 of client device 101 or server 104 are configured as a receiving engine 510. At 510, the receiving engine is configured to receive one or more signals relaying information regarding a current surrounding environment of the client device 101. For instance, these signals may be an ambient noise in the environment, a location of the client device 101, and/or a public record of accident information at the location of the client device 101.

At 520, the processor(s) 201 of client device 101 or the processor(s) 301 of server 104 are configured as a calculator. At 520, the calculator analyzes the signal and determines a risk factor for each signal received by the receiving engine 510. If more than one risk factor was calculated, then the calculator 520 combines the calculated risk factors for each received signal to obtain a total risk factor. If only one risk factor was calculated, then the total risk factor is just the one calculated risk factor. If risk factors associated with different signals are calculated at different times, then the total risk factor is determined based on the calculated risk factors available and may be supplemented as additional risk factors are calculated.

At 530, the processor(s) 201 of client device 101 or the processor(s) 301 of server 104 are configured as a comparator. At 530, the comparator compares the total risk factor to a threshold value related to a confidence level that the user is in danger. In certain embodiments of the disclosure, more than one threshold exists in order to reflect the varying confidence level based on the signals received at the receiving engine 510. In some embodiments, one or more thresholds are configurable.

At 540, the processor(s) 201 of client device 101 or the processor(s) 301 of server 104 are configured as an alerting engine. At 540, the alerting engine determines an appropriate alert to provide at client device 101 based on the results of the comparison done at the comparator 530. For instance, if the total risk factor exceeds a first threshold, then there is a high enough confidence level that the user is potentially in danger and an alert is issued at client device 101 in order to provide warning to the user. Further, in embodiments of the disclosure with more than one threshold, more than one level of alert may be issued. For instance, the alerts may increase in intensity based on the comparator 530 indicating that the total risk factor has exceeded a higher threshold.

Figure 6:
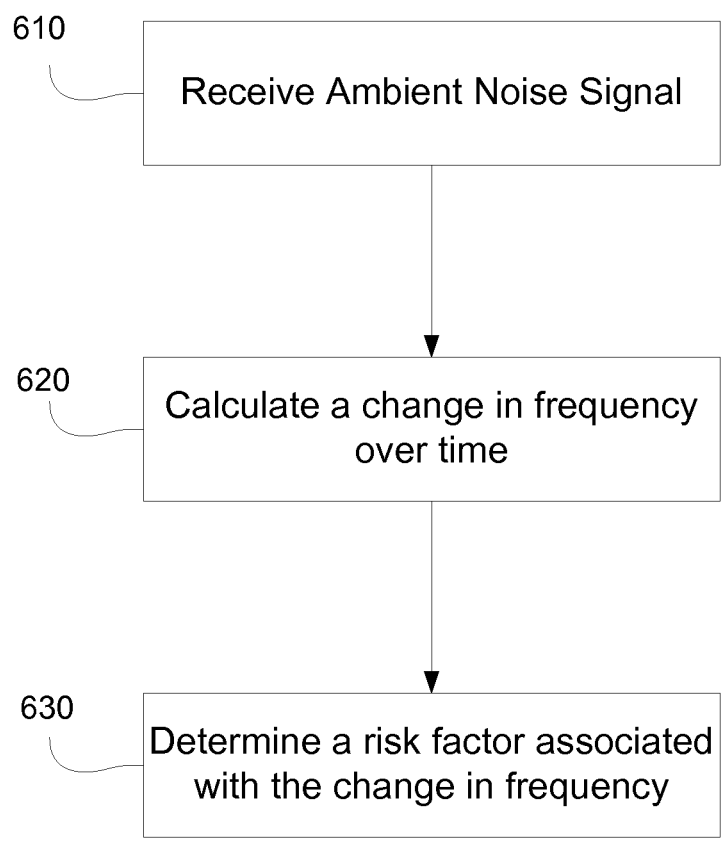
FIG. 6 is a flow diagram for determining a risk factor associated with an ambient noise signal, according to an example embodiment.

FIGS. 6-13 illustrate flow diagrams detailing a particular embodiment of operation of the location awareness engine 500 of FIG. 5. FIG. 6 illustrates a flow diagram for determining a risk factor associated with a signal related to the ambient noise surrounding the client device 101, according to one embodiment of the disclosure. In this flow diagram, at block 610, a location awareness engine 500 receives an ambient noise signal from client device 101. The ambient noise signal is originally received at a microphone configured as an input device 280 (see, FIG. 2) and passed to the location awareness engine 500 either executing as a local location awareness engine 240 at the client device 101 or as a remote location awareness engine 340 executing at the server 104. In either configuration, the location awareness engine 500 calculates a change in frequency over time of the ambient noise signal, at block 620. Finally, the location awareness engine 500 determines a risk factor associated with the change in frequency, at block 630.

Figure 7:
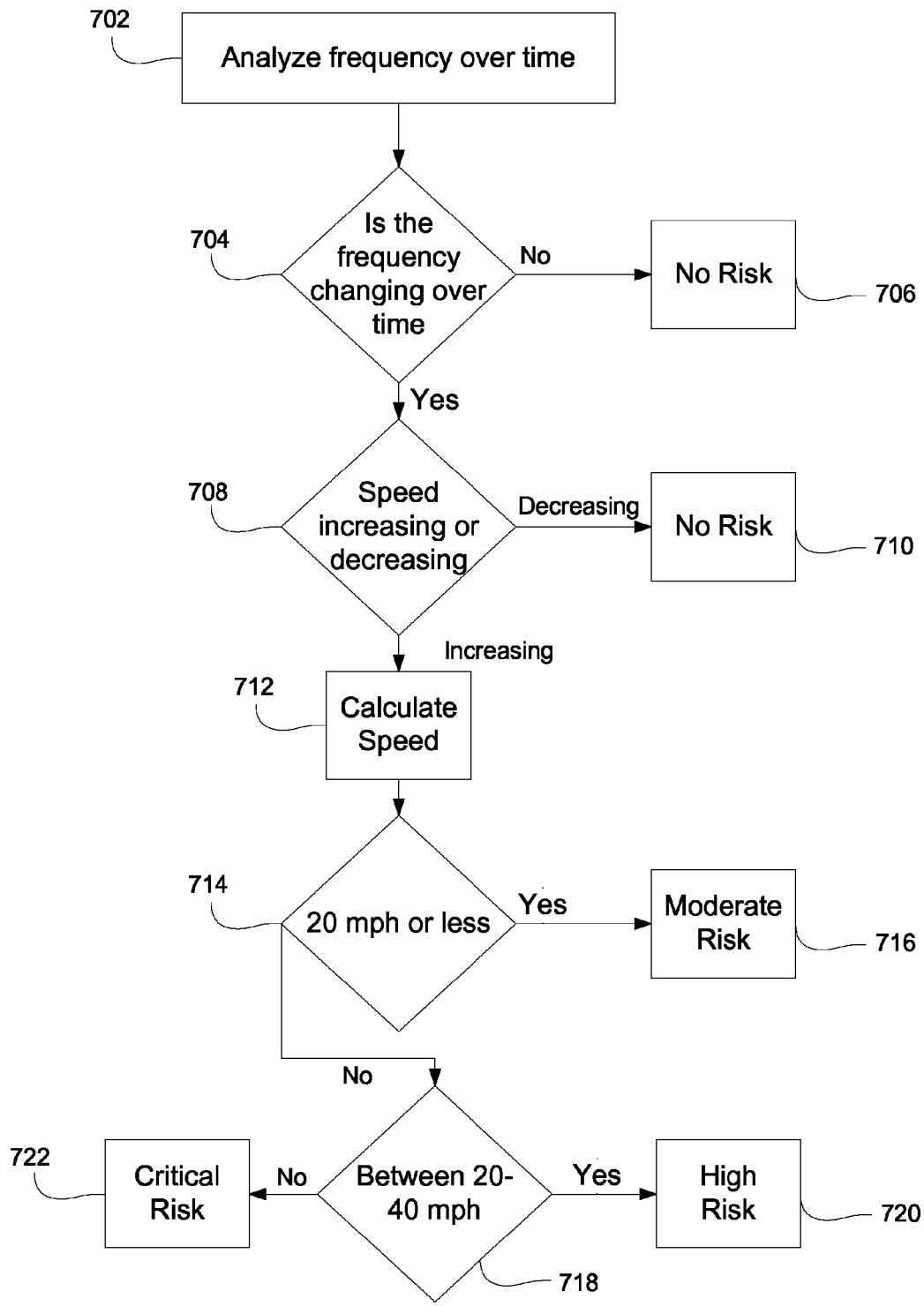
FIG. 7 is a flow diagram illustrating a particular embodiment of the determining a risk factor associated with the ambient noise signal, from FIG. 6.

FIG. 7 provides an embodiment of the disclosure regarding how the risk factor for the ambient noise signal is determined in block 630 from the flow diagram of FIG. 6. The embodiment of the disclosure illustrated in FIG. 7 utilizes the Doppler Effect for sound waves emitted from an object in motion. Therefore, if the frequency of the ambient sound stays constant over time, there is either no object or the object is stationary. If the frequency of the ambient noise decreases, then the object is moving away from the observer, and if the frequency of the ambient noise increases, then the object is moving toward the observer.

Utilizing the Doppler Effect, the location awareness engine 500, in the particular embodiment of FIG. 7, analyzes the change in frequency of the ambient noise signal over time at block 702. At decision block 704, the location awareness engine 500 checks to see if the frequency of the ambient noise changes over time. If the frequency does not change over time, then it is presumed that any object creating noise in the vicinity surrounding the client device 101 is not moving. In this condition, the location awareness engine 500 assesses no risk at block 706 and ends the analysis of the ambient noise signal.

If there is a change in frequency, then the location awareness engine 500 checks to see if the frequency is increasing or decreasing at decision block 708. If the frequency is decreasing, then the location awareness engine 500 determines that the object must be travelling away from the client device 101 and assesses no risk at block 710. If the frequency is increasing, then the location awareness engine 500 proceeds to calculate the speed of the object moving toward the client device 101 based on the total change in frequency over time, at block 712. In the particular embodiment illustrated in FIG. 7, three distinct ranges of speed are utilized to determine three separate levels of risk. While FIG. 7 only illustrates three ranges, more or less ranges are contemplated.

Accordingly, the three ranges of speed in FIG. 7 dictate that for an object determined to be moving toward the client device 101 at less than 20 mph at decision block 714 a moderate risk level will be assessed at block 716. If it is determined that the object is moving faster than 20 mph but slower than 40 mph as decision block 718, then a high risk factor is assessed at block 720. If the object is determined to be travelling faster than 40 mph at decision block 718, then a critical risk factor is assessed at block 722. As an aside, in the embodiment of the disclosure illustrated in FIG. 7, the speeds of 20 mph and 40 mph were chosen as mere examples, as other speeds are contemplated.

Figure 8:
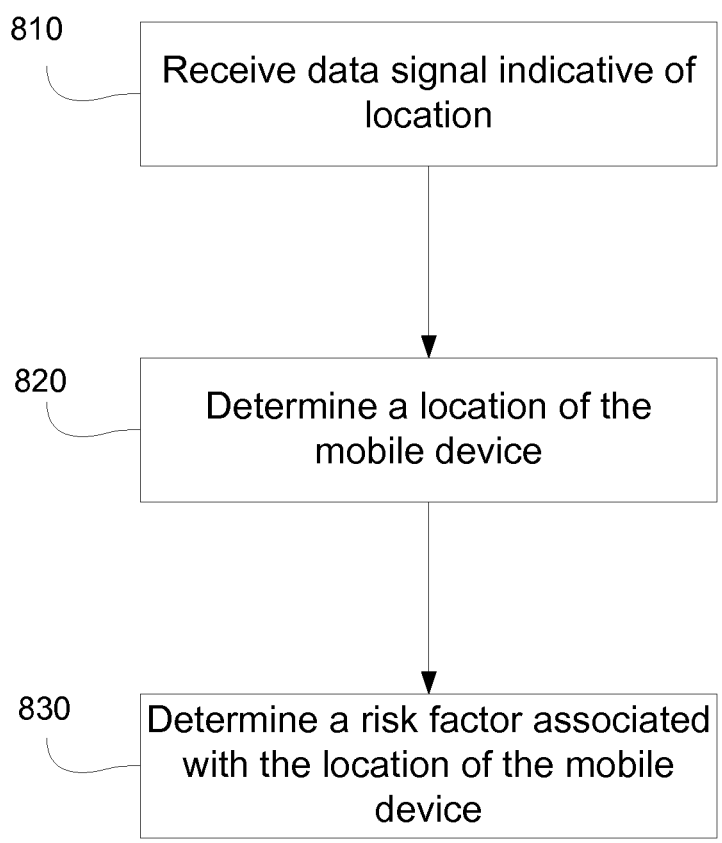
FIG. 8 is a flow diagram for determining a risk factor associated with a location of the client device, according to an example embodiment.

FIG. 8 illustrates a flow diagram for the location awareness engine 500 (see, FIG. 5) determining a risk factor associated with the location of the client device 101, according to one embodiment of the disclosure. To determine a risk factor associated with the location of the client device 101, the location awareness engine 500 first receives a location of the client device 101, at block 810. Next, the location awareness engine 500 determines specific geographic features in proximity to the location of the client device 101, at block 820. Finally, the location awareness engine 500 determines a risk factor based on the location of the client device 101, at block 830.

Figure 9:
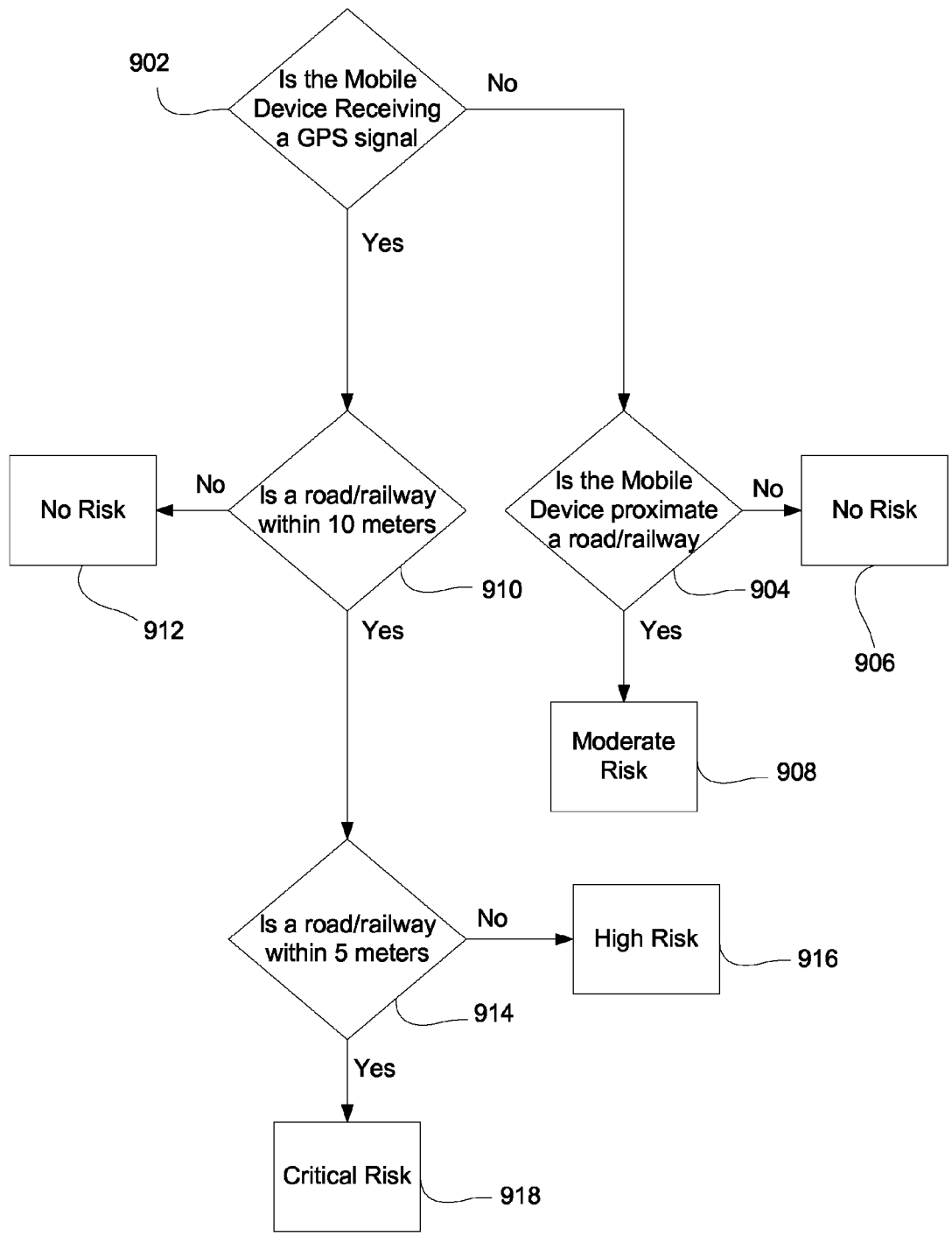
FIG. 9 is a flow diagram illustrating a particular embodiment of the determining a risk factor associated with the location of the client device, from FIG. 8.

FIG. 9 illustrates a specific embodiment of the flow diagram of FIG. 8, according to one embodiment of the disclosure. Specifically, FIG. 9 illustrates a flow diagram where a risk factor based on a current location is determined to be no risk, moderate risk, high risk, or critical risk. At block 902, the location awareness engine checks if the client device 101 is capable of receiving a GPS signal. If the client device 101 is not capable of receiving a GPS signal, then it is assumed that the location information received from the client device 101 will be less accurate. Therefore, at decision block 904, the location awareness engine 500 analyzes the location information from the client device 101 to determine if it is proximate a road or a railway. If the location is determined to not be proximate a road or railway, then no risk is assessed at block 906, and if the location is determined to be proximate a road or railway, then a moderate risk is assessed at block 908.

Returning to decision block 902, if the client device 101 is capable of receiving a GPS signal, then the location awareness engine 500 checks if a railway or road is within ten meters of client device 101, at decision block 910. If the client device 101 is not within 10 meters of a railway or road, then a no risk level is assessed at block 912. However, if the client device 101 is within ten meters of a railway or road, then the location awareness engine 500 checks if the client device 101 is within five meters of a railway or road, at decision block 914. If the client device 101 is not within five meters of a railway or road, then a high risk level is assessed at block 916. If the client device 101 is within five meters of a railway or road, then a critical risk level is assessed at block 918.

Figure 10:
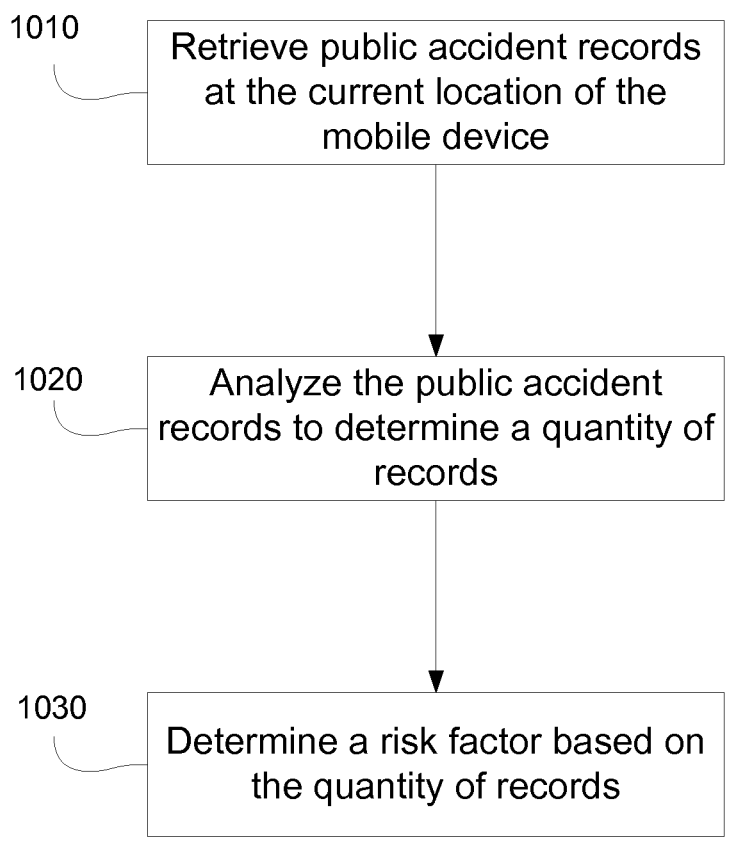
FIG. 10 is a flow diagram for determining a risk factor associated with a public record of accidents at the location of the client device, according to an example embodiment.

FIG. 10 illustrates a flow diagram for the location awareness engine 500 (see, FIG. 5) determining a risk factor associated with a number of accidents involving either a human, an animal, and/or a vehicle within the public record and occurring at the current location of the client device 101, according to one embodiment of the disclosure. At block 1010, the location awareness engine 500 retrieves a quantity of public accident records. At block 1020, the location awareness engine 500 analyzes the retrieved public records to determine a quantity of accidents at that particular location. At block 1030, the location awareness engine 500 determines a risk factor based on the quantity of accidents at that location.

Figure 11:
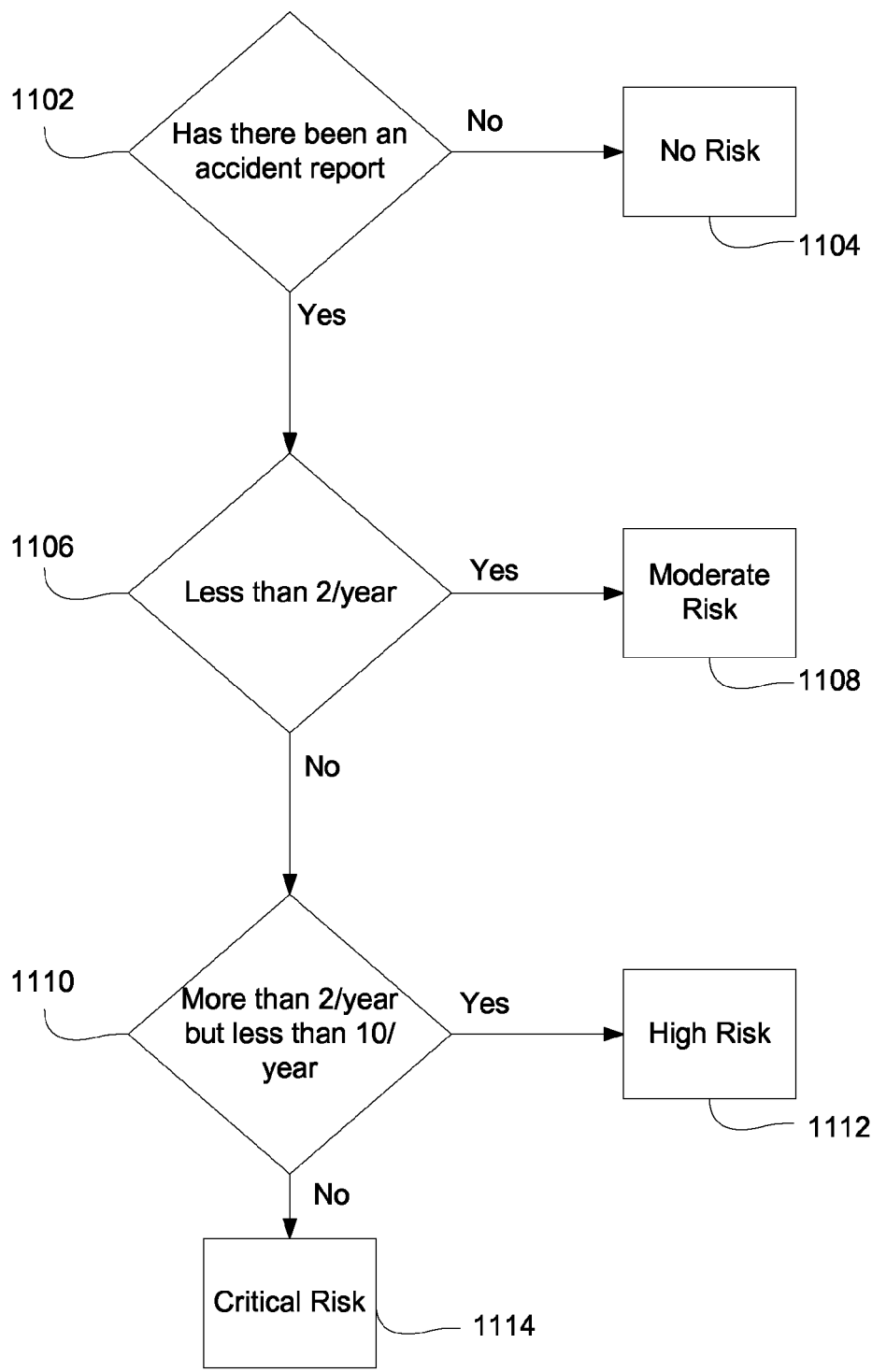
FIG. 11 is a flow diagram illustrating a particular embodiment of the determining a risk factor associated with a public record of accidents at the location of the client device, from FIG. 10.

FIG. 11 illustrates a specific embodiment of the flow diagram of FIG. 10, according to one embodiment of the disclosure. Specifically, FIG. 11 illustrates a flow diagram where a risk factor based on a public record of accident reports associated with the location of the client device 101 is determined to be no risk, moderate risk, high risk, or critical risk. At block 1102, the location awareness engine 500 checks if there is any record of an animal, human, and/or vehicular accident at the current location. If there is no record, then a no risk condition is assessed at block 1104. If there is a record, then the location awareness engine 500 determines whether there were less than two accidents per year, at decision block 1106. If there were less than two accidents per year, then a moderate risk is accessed at block 1108. If the record indicates more than two per year, then the location awareness engine 500 checks whether there are more than two accidents per year but less than ten, at decision block 1110. If there are more than two but less than ten accidents per year, then a high risk is assessed at block 1112. If decision block 1110 determines that there are more than ten accidents per year, then the location awareness engine 500 assesses a critical risk factor, at block 1114. While two and ten accidents are used to define the risk above, other numbers are contemplated. Furthermore, in other embodiments, additional risk assessments may be made based on the severity and time of occurrence of the accidents.

Figure 12:
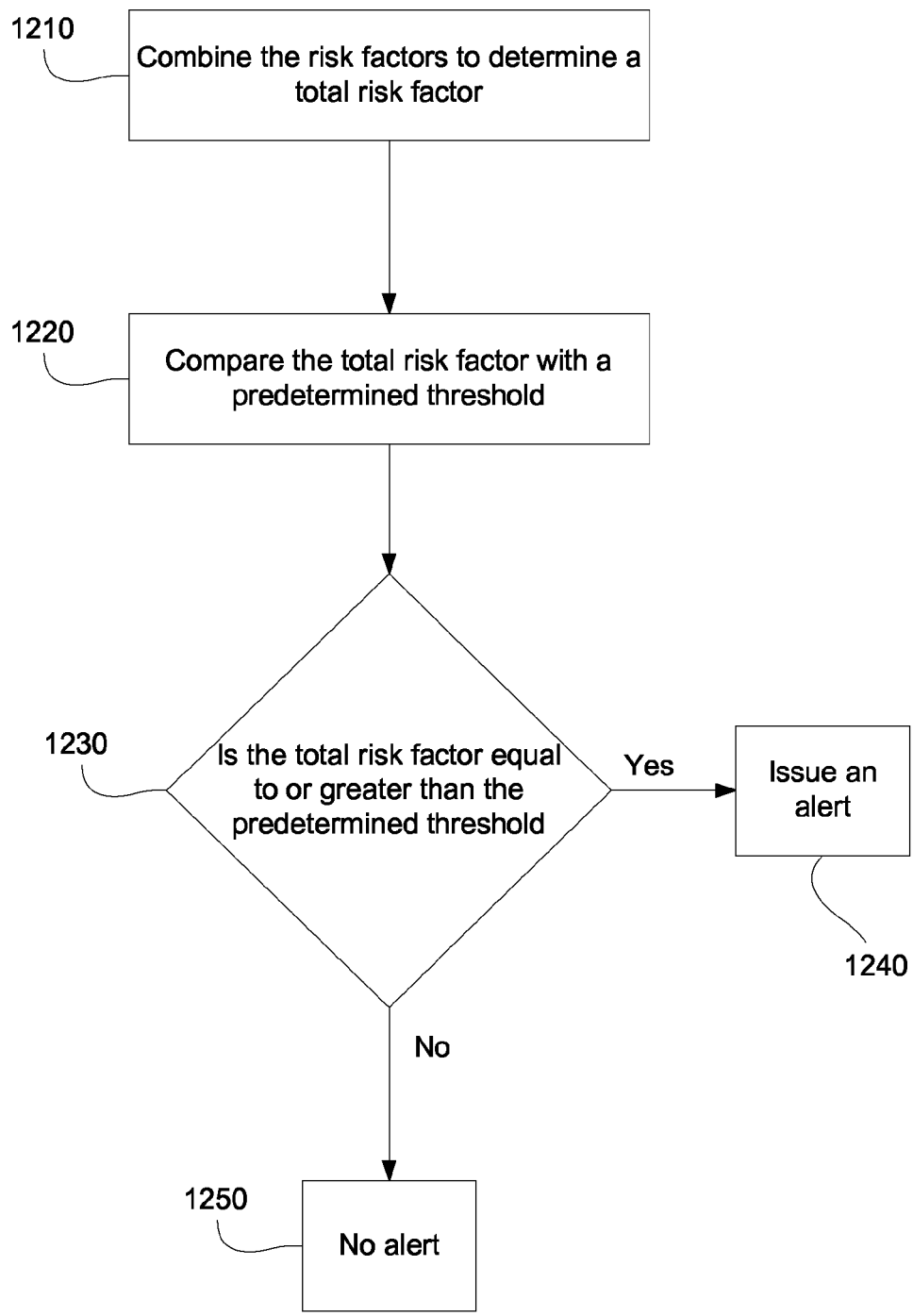
FIG. 12 is a flow diagram for determining whether to issue an alert at the client device, according to an example embodiment.

FIG. 12 illustrates a flow diagram for a decision on whether to provide an alert at the client device 101, according to one embodiment of the disclosure. After the one or more risk factors for the various signals described above are determined, the location awareness engine 500 (see, FIG. 5) combines the risk factors from the various signals to create a total risk factor, at block 1210. In certain embodiments of the disclosure, the total risk factor may be a numerical value corresponding to the combination of accessed risk factors. In other embodiments, the total risk factor may be an average risk factor realized by determining an average of the assessed risk level from all of the received signals. In some embodiments, the total risk factor may be skewed for certain situations that are known to be dangerous. For example, the total risk factor may be automatically assessed as being critical in the event that an object is detected to be moving quickly toward the client device 101, and the client device 101 is in close proximity to a railway or road, or an object is detected to be quickly moving toward the client device 101 and there is a large accident record at that particular location, or any other combination of events that may be considered highly dangerous.

Returning now to the flow diagram in FIG. 12, at block 1220, the location awareness engine 500 compares the total risk factor to a threshold. The threshold represents a confidence level that the user is potentially in danger. At decision block 1230, the location awareness engine 500 compares the total risk factor against the threshold to determine whether the total risk factor is at or above the threshold, and if it is, then issues an alert at block 1240. If the total risk factor does not exceed the threshold, then no alert is issued, at block 1250.

Figure 13:
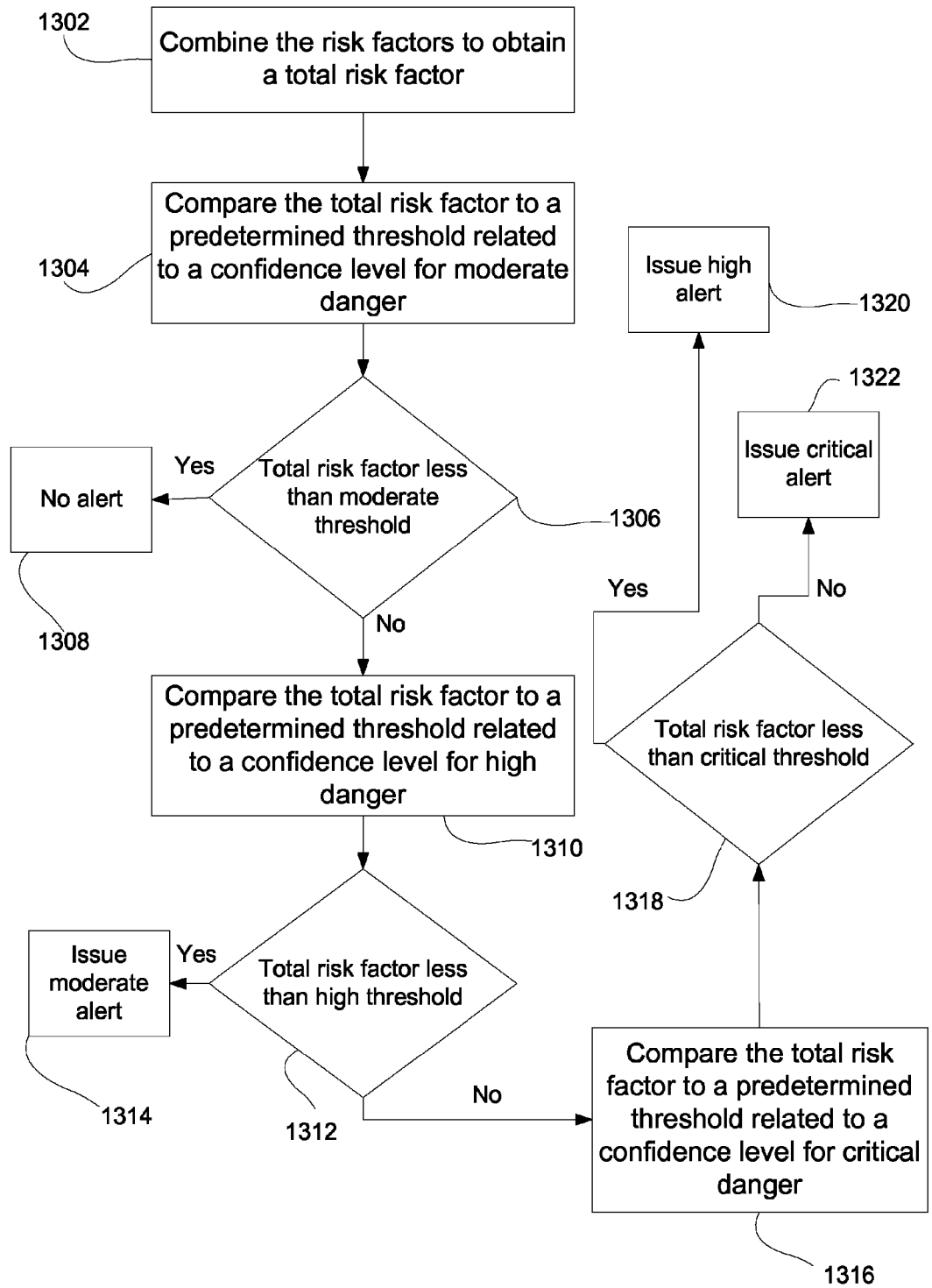
FIG. 13 is a flow diagram illustrating a process to determine a type of alert to issue at the client device, according to an example embodiment.

FIG. 13 illustrates a specific embodiment of the flow diagram of FIG. 12, according to one embodiment of the disclosure. At block 1302, the location awareness engine 500 combines the risk factors assessed in FIGS. 7, 9, and 11 to obtain a total risk factor. At block 1304, the location awareness engine 500 compares the total risk factor to a threshold related to a confidence level that the user is in moderate danger. The results of this comparison are determined at decision block 1306, which asks whether the total risk factor is less than the threshold for moderate danger. If it is less, then no alert is issued, at block 1308.

However, if the total risk factor is higher than the threshold for moderate danger, then a subsequent comparison to a threshold related to a confidence level that the user is in high danger is done at block 1310. If the total risk factor does not exceed this threshold, then a moderate alert is issued at the client device 101, at block 1314. An example of signal conditions that could result in a moderate alert being issued is an object traveling toward the client device 101 at less than 20 miles per hour is detected, GPS is not active so the calculated location is not accurate, and the public accident record indicates less than two accidents per year. An example of a moderate risk alert could be slightly reducing the volume of the client device 101, giving a single vibration of the client device 101, and sending a text message to the client device 101 detailing the risk.

If the comparison done at decision block 1312 reveals that the total risk factor is higher than the threshold that the user is in high danger, then an additional comparison to a threshold related to a confidence level that the user is in critical danger is done at block 1316. If the total risk factor does not exceed this threshold, as determined at decision block 1318, then a high alert is issued at the client device 101, at block 1320. An example of signal conditions that could result in a moderate alert being issued is an object traveling toward the client device 101 between 20 and 40 miles per hour, GPS is enabled on the client device 101 and the GPS coordinates reveal that the client device 101 is within ten meters of a railway or road, and the public records mention a high occurrence of accidents at that particular location, such as more than two accidents per year. An example of a high risk alert could be reducing the volume of the client device 101, causing several vibrations of the client device 101, and sending a text message to the client device 101 detailing the risk.

However, if the comparison shows that the total risk factor is above the threshold related to a confidence level that the user is in critical danger, then a critical alert is issued at the client device 101. An example of the signal conditions that would result in a critical alert is an object moving toward the client device 101 at over 40 miles per hour, GPS is active and the location reveals that the client device 101 is within five meters of a railway or road, and the public records reveal a high accident occurrence at that particular location, such as more than ten accidents per year. An example of a critical risk alert could be silencing the client device 101, causing several vibrations of the client device 101, and sending a text message to the client device 101 detailing the risk.

For situations in which the systems discussed here collect personal information about users, or may make use of personal information, the users may be provided with an opportunity to control whether programs or features collect personal information (e.g., information about a user's social network, social actions or activities, profession, a user's preferences, a user's current location, or a user's demographics information such as health or age), or to control whether and/or how to retrieve content (i.e., recorded voicemails) from a content server (i.e., a voicemail server), or to control storage location of the personal information such as storing the information locally at the client device as opposed to sending to a server. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as, for example, to a city, ZIP code, or state level), so that a particular location of a user cannot be determined. Thus, the user may have control over how information is collected about him or her and used by the systems discussed herein.

The use of the terms "a" and "an" and "the" and "at least one" and similar referents in the context of describing the disclosed subject matter (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate the disclosed subject matter and does not pose a limitation on the scope of the disclosure unless otherwise claimed. No language in the specification should be construed as indicating any non-claimed element as essential to the practice of the invention.

Variations of the embodiments disclosed herein may become apparent to those of ordinary skill in the art upon reading the foregoing description. The inventors expect skilled artisans to employ such variations as appropriate, and the inventors intend for the invention to be practiced otherwise than as specifically described herein. Accordingly, the invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for providing an alert at a client device, comprising:
  receiving an ambient noise signal;
  determining a frequency of the ambient noise signal;
  analyzing the frequency of the ambient noise signal to determine a change in frequency of the ambient noise signal over time;
  determining a first risk factor based on the change in frequency of the ambient noise signal over time; and
  providing an alert at the client device based on the first risk factor.

2. The method according to claim 1, further comprising:
  determining a location of the client device; and
  determining a second risk factor based on the location of the client device;
    wherein the alert is provided based on the first risk factor and the second risk factor.

3. The method according to claim 2, further comprising:
  retrieving a record of accident reports that have occurred at the location of the client device; and
  determining a third risk factor based on the record of accident reports that have occurred at the location of the client device;
    wherein the alert is provided based on the first risk factor, the second risk factor, and the third risk factor.

4. The method according to claim 3, wherein the step of determining the third risk factor comprises:
  determining a quantity of accident reports in the public record of accident reports that have occurred at the location of the client device; and
  assessing one of no risk, moderate risk, high risk, or critical risk based on the quantity of accident reports.

5. The method according to claim 3, further comprising:
  determining a total risk factor based on a combination of the first risk factor, the second risk factor, and the third risk factor; and
  comparing the total risk factor to an at least one threshold;
    wherein the step of providing an alert comprises providing an alert based on the comparing the total risk factor to the at least one threshold.

6. The method according to claim 5, wherein the at least one threshold comprises:
  a first threshold corresponding to a confidence level indicative of moderate risk;

a second threshold corresponding to a confidence level indicative of high risk; and a third threshold corresponding to a confidence level indicative of critical risk.

7. The method according to claim 6, wherein the step of comparing the total risk factor to the at least one threshold comprises:
assessing no risk when the total risk factor does not exceed the first threshold;
assessing moderate risk when the total risk factor exceeds the first threshold and does not exceed the second threshold;
assessing high risk when the total risk factor exceeds the second threshold and does not exceed the third threshold; and
assessing critical risk when the total risk factor exceeds the third threshold.

8. The method according to claim 7, wherein the alert comprises a moderate alert, a high alert, or a critical alert.

9. The method according to claim 8, wherein the step of providing the alert comprises:
providing the no alert if the step of comparing the total risk factor to the at least one threshold assesses no risk;
providing the moderate alert if the step of comparing the total risk factor to the at least one threshold assesses moderate risk;
providing the high alert if the step of comparing the total risk factor to the at least one threshold assesses high risk; and
providing the critical alert if the step of comparing the total risk factor to the at least one threshold assesses critical risk.

10. The method according to claim 2, wherein the step of determining the second risk factor comprises:
determining whether the location of the client device is proximate to an area known to have increased vehicular traffic;
assessing no risk if the location of the client device is not proximate to the area known to have increased vehicular traffic; and
assessing one of moderate risk, high risk, or critical risk if the location of the client device is proximate to the area known to have increased vehicular traffic based on a distance of the client device from the area known to have high vehicular traffic.

11. The method according to claim 1, wherein the step of determining the first risk factor comprises:
calculating a speed of an object based on the change in frequency of the ambient noise signal over time in response to the change in frequency increasing.

12. The method according to claim 11, wherein the first risk factor is assessed as one of moderate risk, high risk, or critical risk based on the speed of the object.

13. A computer readable storage device for providing an alert at a client device, the computer readable storage device having computer executable instructions for performing the steps of:
receiving an ambient noise signal;
determining a frequency of the ambient noise signal;
analyzing the frequency of the ambient noise signal to determine a change in frequency of the ambient noise signal over time;
determining a first risk factor based on the change in frequency of the ambient noise signal over time; and
providing an alert at the client device based on the first risk factor.

14. The computer readable storage device of claim 13, further comprising instructions for performing the steps of:
determining a location of the client device; and
determining a second risk factor based on the location of the client device;
wherein the alert is provided based on the first risk factor and the second risk factor.

15. The computer readable storage device of claim 14 further comprising instructions for performing the steps of:
retrieving a record of accident reports that have occurred at the location of the client device; and
determining a third risk factor based on the record of accident reports that have occurred at the location of the client device;
wherein the alert is provided based on the first risk factor, the second risk factor, and the third risk factor.

16. The computer readable storage device of claim 15, wherein the instructions for determining the third risk factor comprises:
determining a quantity of accident reports in the public record of accident reports that have occurred at the location of the client device; and
assessing one of no risk, moderate risk, high risk, or critical risk based on the quantity of accident reports.

17. The computer readable storage device of claim 15, further comprising instructions for performing the steps of:
determining a total risk factor based on a combination of the first risk factor, the second risk factor, and the third risk factor; and
comparing the total risk factor to an at least one threshold;
wherein the step of providing an alert comprises providing an alert based on the comparing the total risk factor to the at least one threshold.

18. The computer readable storage device of claim 17, wherein the at least one threshold comprises:
a first threshold corresponding to a confidence level indicative of moderate risk;
a second threshold corresponding to a confidence level indicative of high risk; and
a third threshold corresponding to a confidence level indicative of critical risk.

19. The computer readable storage of claim 18, wherein the instructions for comparing the total risk factor to the at least one threshold comprises:
assessing no risk when the total risk factor does not exceed the first threshold;
assessing moderate risk when the total risk factor exceeds the first threshold and does not exceed the second threshold;
assessing high risk when the total risk factor exceeds the second threshold and does not exceed the third threshold; and
assessing critical risk when the total risk factor exceeds the third threshold.

20. The computer readable storage device of claim 14, wherein the instructions for determining the second risk factor comprises:
determining whether the location of the client device is proximate to an area known to have increased vehicular traffic;
assessing no risk if the location of the client device is not proximate to the area known to have increased vehicular traffic; and
assessing one of moderate risk, high risk, or critical risk if the location of the client device is proximate to the area known to have increased vehicular traffic based on a distance of the client device from the area known to have high vehicular traffic.

21. The computer readable storage device of claim 13, wherein the instructions for determining the first risk factor comprises:
    calculating a speed of an object based on the change in frequency of the ambient noise signal over time in response to the change in frequency increasing.

22. The computer readable storage device of claim 13, wherein the first risk factor is assessed as one of moderate risk, high risk, or critical risk based on the speed of the object.

23. A mobile alert system configured to provide an alert at a client device, the mobile alert system comprising:
    a location awareness engine configured to receive one or more signals indicative of a surrounding environment of the client device, wherein the signals indicative of a surrounding environment of the client device comprise:
    an ambient noise signal from a microphone coupled to the client device;
    wherein the location awareness engine is configured to determine a total risk factor based on the signals indicative of the surrounding environment of the client device; and
    wherein the location awareness engine is configured to instruct the client device to provide an alert based on the total risk factor.

24. The mobile alert system of claim 23, wherein the signals indicative of a surrounding environment of the client device further comprise a location of the client device received from a network interface coupled to the client device and configured to communicate with a data network.

25. The mobile alert system of claim 24, further comprising:
    a public record engine configured to:
    receive the location of the client device;
    retrieve accident reports related to the location of the client device;
    accumulate the accident reports; and
    transmit the accident reports to the location awareness engine; and
    wherein the location awareness engine is further configured to:
    receive the accident reports from the public record engine;
    determine a quantity of accident reports; and
    supplement the total risk factor based on the quantity of accident reports.

26. The mobile alert system of claim 25, wherein the location awareness engine is integrated into the client device.

27. The mobile alert system of claim 25, wherein the location awareness engine is integrated into a server, the server includes a network interface coupled to a data network, the server configured to communicate with the client device through the data network.

* * * * *